| | 1 | 8C (5) | 6 | 9A 8B | 8A 9B | 8I | 9I | 11 | 9C (10) | 15 | 22 | 18 | 17 |
|---|---|---|---|---|---|---|---|---|---|---|---|---|---|
| CLOCK "0" | 1 | 0 | 0 | 1 | 0 | 1 | 1 | 0 | 1 | 0 | 1 | 0 | 1 |
| CLOCK "1" | 1 | 0 | 0 | 0 | 1 | 0 | 1 | 1 | 0 | 0 | 1 | 1 | 1 |
| CLOCK "0" | 0 | 1 | 0 | 0 | 1 | 1 | 1 | 0 | 0 | 1 | 1 | 0 | 1 |

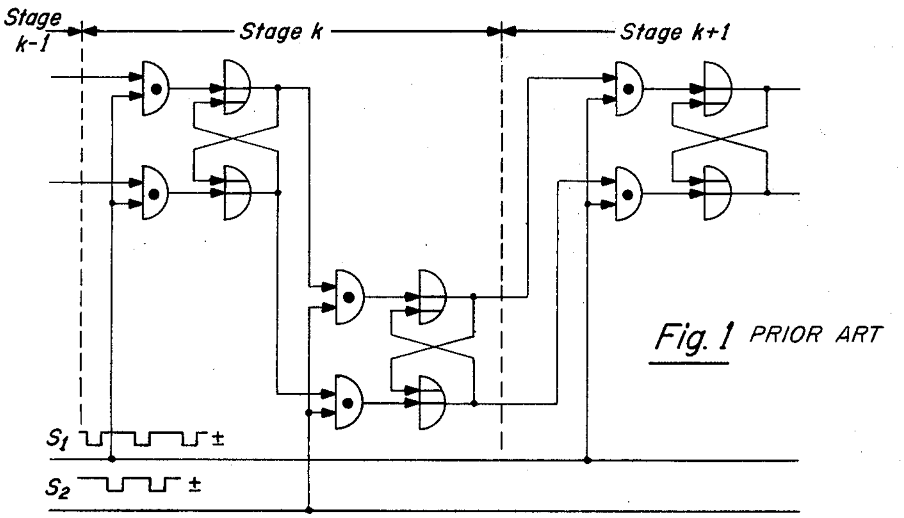
Fig. 1
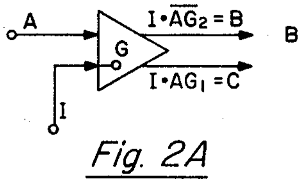
Fig. 2A
Gated Amplifier Truth Table
| Input | | Output | |
|---|---|---|---|
| I | A | B | C |
| 0 | 0 | 0 | 0 |
| 0 | 1 | 0 | 0 |
| 1 | 0 | 1 | 0 |
| 1 | 1 | 0 | 1 |
Fig. 2B
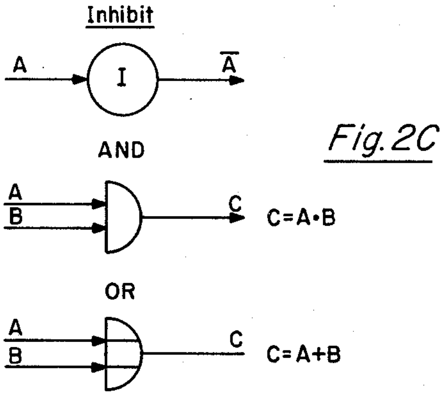
Fig. 2C
INVENTORS
DONALD E. MARSHALL Jr.
EDWIN H. PAUL Jr.
BY Robert B. Brodie
ATTORNEY Logic Block Diagram

INVENTORS
DONALD E. MARSHALL Jr.
EDWIN H. PAUL Jr.
BY Robert B. Bodie
ATTORNEY

INVENTORS
DONALD E. MARSHALL Jr.
EDWIN H. PAUL Jr.
BY Robert B. Brodie
ATTORNEY

United States Patent Office 3,509,381
Patented Apr. 28, 1970

3,509,381

MULTIVIBRATOR CIRCUIT INCLUDING OUTPUT BUFFER MEANS AND LOGIC MEANS

Donald E. Marshall, Jr., Framingham, and Edwin H. Paul, Jr., Natick, Mass., assignors to Honeywell Inc., Minneapolis, Minn., a corporation of Delaware Filed Jan. 11, 1967, Ser. No. 608,688
Int. Cl. H03k 3/12
U.S. Cl. 307—292 8 Claims

ABSTRACT OF THE DISCLOSURE

A symmetrically switchable multivibrator having a pair of gated amplifiers coupled in bistable flip-flop array, each gated amplifier capable of maintaining a partially switched state near the switching threshold in a first one of two stable states. Additional circuitry biases one of the gated amplifiers into the partially switched state responsive to the leading edge of a clock or synchronizing signal while concurrently maintaining the same output signal conditions. The additional circuitry further switches the gated amplifier from the partially switched state to the second stable state in response to the trailing edge of the clock or synchronizing signal.

This invention relates to improvements in multi-vibrators and more particularly to improvements in the symmetrical switching of multi-vibrators.

The switching speed of multivibrators particulary when they are used as storage elements has been limited by the fact of having to drive high load currents. It has also been desired to have some physical remembering of the state of the primary storage element during any interval in which the primary storage element was in the state of change. These aspects have been satisfied in part by the use of a pair of multivibrators in master-slave array. The master multivibrator was coupled to the digital information source and at the same time only lightly loaded by the slave flip-flop. The slave flip-flop was coupled to the output utilization circuitry. Examples of such solutions may be found in U.S. Patent 3,033,452 issued to R. H. Mayne on May 8, 1962. Reference is also made to Digital Computer Engineering by Harry J. Gray published by Prentice-Hall in 1963 L.C. 63–14842, pages 94–99.

The problems posed by the heavy loading of the slave section were still not substantially overcome. With one active element of the slave multivibrator in a deep saturation condition, the complementary outputs could not be switched symmetrically. There was also dissatisfaction with the delay associated in the serial readout of information from the master multivibrator through the slave multivibrator.

It is accordingly an object of this invention to devise an arrangement for symmetrically switching the complementary outputs of a multivibrator.

It is yet another object of this invention to symmetrically switch the complementary outputs of a multivibrator driving a substantial load current.

These and other objects are satisfied by an arrangement in which a first and a second gated amplifier are cross-coupled in a bistable flip-flop array, with each gated amplifier being capable of maintaining a partially switched state near the switching threshold in the first stable state of two stable states. A first and a second output buffer are respectively coupled to the first and second gated amplifiers. A logic arrangement conditioned by the signal appearances at the output buffers and responsive to the leading edge of a clock or synchronizing signal biases that particular gated amplifier which has assumed the first stable state. This results in a transfer by that gated amplifier into a partially switched state. The logic arrangement is further responsive to the trailing edge of the clock or synchronizing signal for switching that gated amplifier from the partially switched state into the second stable state. Thus, the complementary outputs as represented at the output buffers remain the same although one of the active elements becomes partially switched. The actual change of state occurs in response to the trailing edge of the clock or synchronizing signal. The speed and symmetric switching advantage is accomplished by pre-conditioning or biasing that element which is driving the heavy current load into the partially switched state.

A description of the invention may be assisted by the following drawings in which:

FIGURE 1 represents a pair of multivibrators in master-slave relationship according to the prior art;

FIGURE 2A is a diagrammatic representation of the logical properties of a gated amplifier according to the invention;

FIGURE 2B is a truth table associated with the gated amplifier as shown in FIGURE 2A;

FIGURE 2C is a diagrammatic representation of the logical properties of the conventional gate structures associated with the invention;

Figures 3A, 3B:
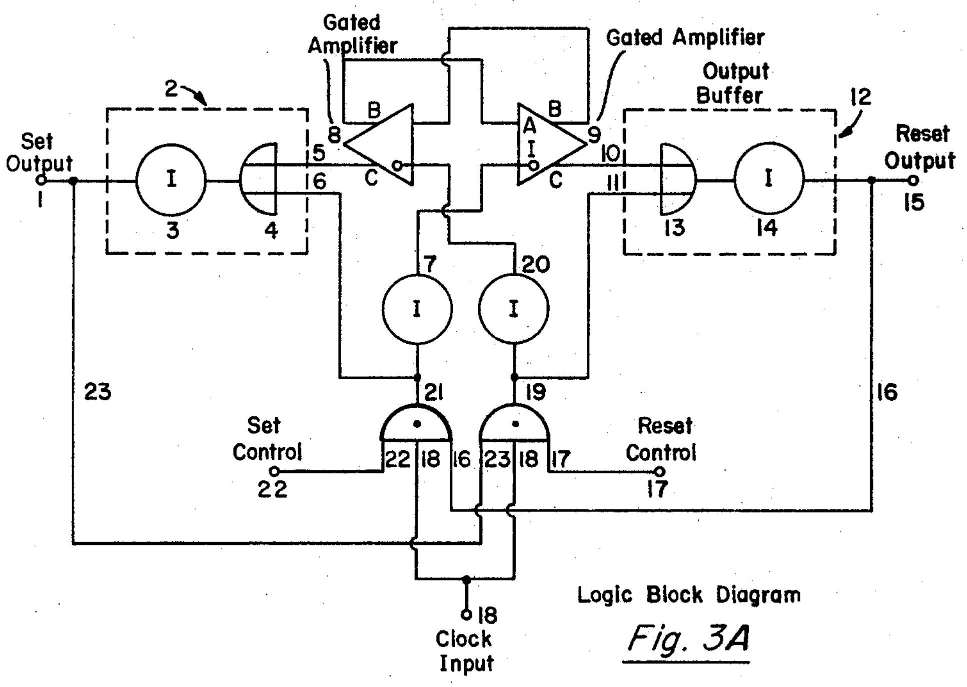
FIGURE 3A shows a logical block diagram illustrative of the symmetrical switching according to the invention.
Figure 4:
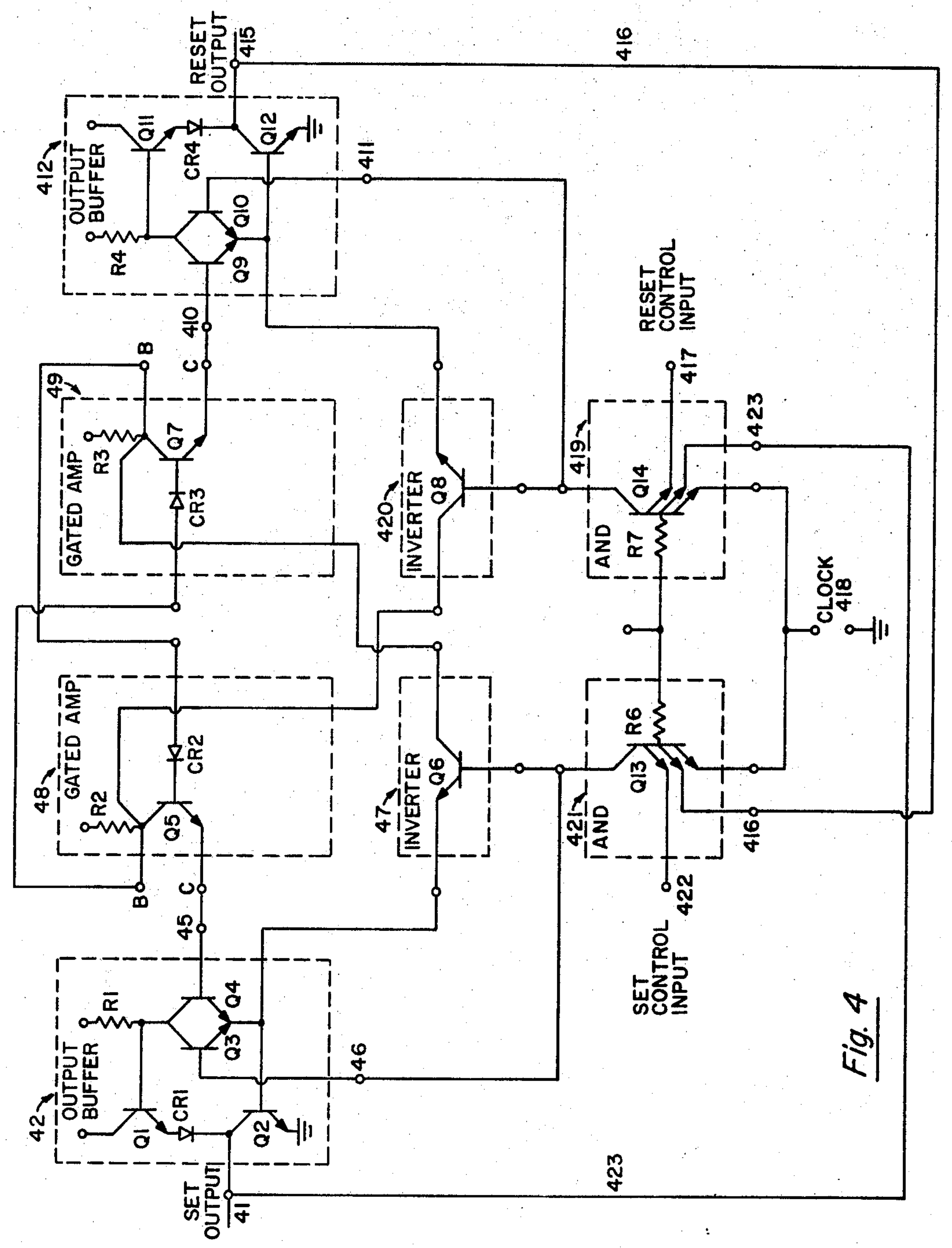

FIGURE 3B exhibits the logical state at selected points in the logic block diagram according to the logical state of the clock or synchronizing signal;

FIGURE 4 is a circuit diagram according to the invention as shown in FIGURE 3A.

FIGURE 1 shows a first and a second multivibrator in master-slave relationship as used in a double rank shift register according to the prior art. This known arrangement permits the gating by activation of $S_1$ of information into the master (leftmost) multivibrator and the transfer of information from the master multivibrator to the slave multivibrator by activation of lead $S_2$. As pointed out in the specification introduction, the master-slave multivibrator arrangement permits faster switching of the input multivibrator due to the fact that it is loaded only by the slave multivibrator. There is still present the unsolved problems of the comparatively heavier loading of the slave flip-flop, and the concomitant non-symmetric switching. The non-symmetry results from one active element being in saturation. Also present in the delay associated with the transfer of information from the master through the slave to the utilization circuit.

FIGURE 2A is a logical representation of the gated amplifier as is used in the invention. The gated amplifier G has a first input A and an inhibit input I. There are two output appearances, namely B and C. The logical behavior of the gated amplifier is represented in FIGURE 2B. As may be seen, when the inhibit I input is in the null or zero condition, outputs B and C are also in the null or zero condition irrespective of the zero or one condition on input A. When the input I is in the one condition, the B and C are respectively one and zero when A input is zero and zero and one when A is one.

The outputs and inputs may be represented by the logical equations:

(A) $B=\bar{A}\cdot I$ (B) $C=A\cdot I$

FIGURE 2C shows the logical relations of the standard INHIBIT, AND, and OR gates for purposes of completeness.

FIGURE 3A exhibits a logic block diagram of the invention. A structural description of the logic block diagram will be followed by a dynamic description.

In FIGURE 3A, a first gated amplifier 8 has its B output cross-coupled to the A input of a second gated amplifier 9. Likewise, the B output of the second gated amplifier 9 is cross-coupled to the A input of the first gated amplifier 8. This cross-coupling forms a bistable multivibrator or flip-flop. It should be noted that each gated amplifier is capable of maintaining a partially switched state in the first one of two stable states. This aspect is described in connection with the discussion of FIGURE 4. The logic of the first and second gated amplifiers are described and shown in connection with FIGURES 2A and 2B.

Output buffer 2 interconnects the C output of gated amplifier 8 over line 5 to the SET output terminal 1. A second output buffer 12 connects the C output of gated amplifier 9 over line 10 to the reset output terminal 15. Each output buffer contains inverters 3 and 14 connected in series with respective OR gates 4 and 13. The inverter-OR gate combination forms what is known in the art as a NOR gate.

The multi-vibrator further comprises a pair of AND gates 21 and 19. Each AND gate has three inputs, namely an output feedback input, i.e. 16 or 23; a control input, i.e. a SET or a RESET 22 and 17; and a clock input 18. Thus, the first AND gate 21 terminates SET control input 22, clock input 18 and RESET output 16. The second AND gate 19 terminates RESET control input 17, clock input 18 and SET output 23. The output of the first AND gate 21 is directly terminated in line 6 into OR gate 4 of output buffer 2. The negation of the output is terminated in the I input of gated amplifier 9 through inverter 7. The output of the second AND gate 19 is directly terminated in line 11 in OR gate 13 in the output buffer 12. The logical negation of the output is terminated in the I input of the first gated amplifier 8 through inverter 20.

THE BASIC TOGGLE OPERATION

In this description, a binary "one" is assumed to be represented by a positive voltage. A binary "zero" is assumed to be represented by the absence of a positive voltage.

In connection with the dynamic description of the logical diagram reference should be made to FIGURE 3B. FIGURE 3B shows the logical condition of selected points in the circuit.

The basic toggle operation consists of actuating the circuit by means of the leading edge of the clock or synchronizing input signal at point 18. This should precondition that gated amplifier which is in the "one" condition. There should be no change of state at the output appearances 1 and 15. When the clock or synchronizing input at 18 changes from 1 to 0, the system at that point in time should switch at the output appearances.

It should be noted that the SET and RESET controls 22 and 17 must be in the one state respectively in order for switching to occur. As a consequence, they will be assumed to be in the one state during the entire clocking cycle.

Assuming that the SET output is in the binary "one" with the RESET output 15 in the "zero" state and the clock input "zero," there is a "zero" output from AND gates 21 and 19 respectively. Thus, "zero" inputs appear on lines 6 and 11. Since the SET output is assumed "one" there is a "zero" appearing on line 5, i.e. the C output of gated amplifier 8. With the RESET output assumed "one" there is a "one" appearing on line 10, i.e. the C output of gated amplifier 9. A "one" appears on inhibit I inputs of the gated amplifiers 8 and 9. At this point, the states of the gated amplifiers 8 and 9 are uniquely determined. Illustratively, with the C output and I input respectively at "zero" and "one" for gated amplifier 8, the B output and the A input must be (according to FIGURE 2B) "one" and "zero" respectively. With both the A and I inputs to gated amplifier 9 at a "one," the B output of gated amplifier 9 must be "zero." The C output of gated amplifier 9 is a "one" which is inverted at inverter 14 and appears as a "zero" at output 15.

As the clock input at terminal 18 changes from "zero" to "one" all three of the inputs at AND gate 19 are "one." AND gate 21 remains inoperative because of the "zero" still appearing on lead 16. The "one" output from AND gate 19 is applied to OR gate 13 over lead 11. However, no change occurs because this becomes inverted to "zero" through inverter 14 at the RESET output 15.

A change, however, does occur at gated amplifier 8 because the inhibit I lead changes from "one" to "zero." The B output of gated amplifier 8 changes from "one" to "zero." The A and the I inputs for gated amplifier 9 are now respectively zero and one. There appears a zero output on the C lead of gated amplifier 9. As a consequence of this condition, the internal states of the multivibrator has changed. Specifically, the condition of gated amplifier 8 has changed. As is readily apparent, the outputs, as seen at the terminals 1 and 15, remain the same.

As the clock at terminal 18 changes from "one" to "zero," AND gate 19 is disabled with a "one" being applied to the I input lead of gated amplifier 8. With both the A and I inputs "one," the C output of gated amplifier 8 changes from a "zero" to a "one," this is inverted at inverter 3 and appears as a "zero" at SET output. The change of state of gated amplifier 8 causes a "zero" to be impressed on the A input of gated amplifier 9. Gated amplifier 9 now becomes switched with a "zero" appearing on both leads 10 and 11. This is inverted to "one" at inverter 14 appearing as a "zero" on RESET output 15.

FIGURE 4 represents an electrical circuit embodiment of the logic block diagram shown in FIGURE 3A. A structural description of the circuit will be followed by a dynamic description.

AND gates 421 and 419 comprises multi-emitter transistors Q13 and Q14 respectively. The SET control input 422, the RESET output 416, and clock input 418 terminate in AND gate 421. Likewise, clock input 418, SET output 423, and RESET control input 417 terminate in AND gate 419.

Gated amplifiers 48 and 49 have their B and C outputs driven by transistors Q5 and Q7 respectively. The A input drives the base of the transistors through diodes CR2 and CR3. The I inputs terminated directly at the collector junctions of transistors Q5 and Q7.

Output buffer 42 is connected to the gated amplifier 48 with the emitter terminal of transistor of Q5 driving the base terminal of transistor Q4. Likewise, the output buffer 42 is connected to AND gate 421 with the collector of transistor Q13 driving the base terminal transistor Q3. Transistors Q3 and Q4 with resistor R1 form an OR gate corresponding to OR gates 4 and 13 in FIGURE 3A. Output buffer 412 has the same construction as output buffer 42. Transistors Q9 and Q10 form an OR gate. Transistor Q12 represents an inverter driving RESET output 415 with the inputs to the OR gate being provided from transistor Q7 and gated amplifier 49. The output from AND 419 over line 411. A portion of the SET output 41 and RESET output 415 respectively coupled AND gates 419 over line 423 and AND gate 421 over line 416.

Inverters 47 and 420 comprise single transistors respectively Q6 and Q8. Transistors Q6 and Q8 are driven at their base by the respective outputs of transistors Q13 and Q14. The collector of transistor Q8 drives the I input of gated amplifier 48. Also, the collector of transistor Q6 drives the I input of gated amplifier 49.

The toggle action of the multivibrator when referenced to FIGURE 4 shall now be described.

It is assumed that clock input 418 and reset output 415 are in the "zero" state. It is further assumed that set output 41, set control input 422 and reset control input 417 are in the "one" state. The "one" state or level is defined as a positive voltage with the "zero" level being a "zero" voltage.

Initially, transistors Q13 and Q14 are saturated due to current from voltage source $V_{cc}$ through resistors R6 and R7. This action holds transistors Q3, Q6, Q8 and Q10 in the open circuit condition. Transistors Q12, Q9, Q7 and diode CR3 are in the conducting or "on" condition. The collector of transistor Q7 is at a sufficiently low enough potential to hold CR2 and transistors Q5, Q4 and Q2 off and the collector of transistor Q9 is low enough to hold transistor Q11 and diode CR4 in the off condition. Thus, the RESET output 415 is maintained at the "zero" level. Since transistors Q2, Q3 and Q4 are off, resistor R1 maintains the set output 41 at the "one" level through transistor Q1 and diode CR1. A stable condition is formed.

If the clock input 418 now rises to a "one" level, the emitters of transistors Q13 and Q14 being joined to the clock input 418 become reverse biased. The current through resistor R6 is diverted to the emitter of transistor Q13 connected to the reset output 416. Thus, transistor Q13 remains saturated. The current through resistor R7 is diverted through transistor Q14's collector into transistors Q8 and Q10 staurating them. When transistor Q8 saturates, then diode CR3 and transistors Q7 and Q9 are turned off. The collector of transistor Q7 rises and turns on diode CR2 and the collector junction of transistor Q5. This is because transistor Q8 pulls the collector of transistor Q5 to a low level. The emitter of transistor Q5 is not turned on and transistors Q4 and Q2 remain off. When transistor Q10 saturates, the base of transistor Q11 remains low, even when transistor Q9 turns off. Transistor Q12 remains on since it receives base current from transistors Q8 and Q9. The result is that when the clock input rises, the outputs do not change state although the flip-flop array formed by transistors Q5 and Q7 has had its state altered.

When the clock input 418 returns to a "zero" level, transistor Q14 is turned "on" forcing transistors Q8 and Q10 off. Transistor Q13 remains "on" and transistors Q3 and Q6 remain off. When transistors Q8 and Q10 turn off, transistor Q12 has no base drive and turns off. In addition, when transistor Q10 turns off, the base of transistor Q11 rises and drives the reset output 416 to a "one" level. When transistor Q8 turns off, transistor Q5 is no longer clamped through its collector and turns "on" in a normal manner. Transistor Q5 then drives transistors Q4 and Q2 into the "on" condition with the set output 41 going to the "zero" level. Transistor Q4 is saturated and in turn turns transistor Q1 and diode CR1 "off." This permits transistors Q2 to saturate.

The consequence of this circuit action is that when the clock input falls, the outputs are simultaneously switched. The falling clock input disables the internal circuit made up of transistors Q3, Q6, Q8, Q10, Q13 and Q14 and allows transistors Q5 and Q7 to determine the state of the outputs.

The foregoing embodiment is merely illustrative of the invention as set forth in the appended claims.

What is claimed is:

1. A multivibrator circuit comprising:

(a) a set output terminal and a reset output terminal;

(b) first and second gated amplifiers, each gated amplifier having first and second input terminals and first and second output terminals, said gated amplifiers being cross-coupled with each other in a bistable arrangement through their respective first input and output terminals, said gated amplifiers adapted to maintain first and second stable states, said circuit adapted to assume a partially switched state;

(c) first and second output buffers, each having an input terminal and an output terminal, the input terminal of said each output buffer being coupled to one output terminal of the same-numbered gated amplifier, said output terminals of said first and second output buffers being connected, respectively, to said set and reset terminals; and (d) logic means coupled to said second input terminal of said gated amplifiers and including a clock input terminal, said logic means being responsive to signals at the output terminals of said output buffers and responsive to the leading edge of a signal impressed on said clock input terminal to switch said gated amplifiers from the first stable state to the partially switched state, said logic means being further responsive to the trailing edge of the signal impressed on said clock input terminal to switch said gated amplifiers from the partially switched state to the second stable state.

2. A multivibrator circuit as defined in claim 1 wherein the first output terminal of each gated amplifier is activated by the concurrent activation of the second input terminal thereof and the absence of an activation of the first input terminal thereof.

3. A multivibrator circuit as defined in claim 1 wherein the cross-coupled gated amplifiers are connected so that the first output terminal of said first gated amplifier is coupled to the first input terminal of said second gated amplifier, and the first output terminal of said second gated amplifier is coupled to the first input terminal of said first gated amplifier.

4. A multivibrator circuit as defined in claim 1 wherein each output buffer comprises an inhibit gate connected in series with an OR gate between the input and output terminals of their respective output buffer.

5. A multivibrator circuit as defined in claim 4 wherein said logic means includes first and second AND gates connected in series with respective first and second inverters.

6. A symmetrically switchable multivibrator comprising:

(a) first and second gated amplifiers, each having first and second input terminals and first and second output terminals, the first output terminal of each gated amplifier being cross-coupled to the first input terminal of the other gated amplifier;

(b) a first and a second logic gate having an input terminal coupled respectively, to the second output terminal of said first and second gated amplifiers wherein said first and second logic gates comprise NOR gates;

(c) a clock input terminal;

(d) a third logic gate adapted to apply the logical product of a clock signal coupled from the clock input terminal and an output signal coupled from the second NOR gate to the first NOR gate, and to apply the logical complement of said logical product to the second input terminal of said second gated amplifier; and (e) a fourth logic gate adapted to apply the logical product of a clock signal coupled from the clock input terminal and an output signal coupled from the first NOR gate to the second NOR gate, and to apply the logical complement of the last-recited logical product to the second input terminal of said first gated amplifier.

7. A symmetrically switchable multivibrator as defined in claim 6 wherein each gated amplifier responds to concurrent activation of the second and first input terminals to activate its second output terminal and wherein each gated amplifier responds to concurrent activation of the second input terminal and the absence of an activation of the first input terminal to activate its first output terminal.

8. A symmetrically switchable multivibrator comprising:

(a) first and second gated amplifiers, each having first and second input terminals and first and second output terminals, the first output terminal of each gated amplifier being coupled to the first input terminal of the other gated amplifier, each gated amplifier responding to the joint activation of the second input terminal and the negation of the first input terminal to activate its first output terminal, and each gated amplifier responding to the joint activation of the second and the first input terminals to activate its second output terminal;

(b) a first and second NOR gate, each having an input terminal coupled to the second output terminals of the corresponding first and second gated amplifiers;

(c) a first logic gate adapted to apply the logical product of a clock signal coupled from the clock input terminal and an output signal coupled from the second NOR gate to the first NOR gate, and applying the logical complement of said logical product to the second input terminal of said second gated amplifier; and (d) a second logic gate adapted to apply the logical product of a clock signal coupled from the clock input terminal and an output signal coupled from the first NOR gate to the second NOR gate, and applying the logical complement of the last-recited logical product to the second input terminal of said first gated amplifier.

References Cited

UNITED STATES PATENTS

| | | | |
|---|---|---|---|
| 3,110,821 | 12/1963 | Webb | 307—215 |
| 3,139,540 | 6/1964 | Osborne | 307—215 |
| 3,206,683 | 9/1965 | Davis et al. | 307—215 |
| 3,286,245 | 11/1966 | Cozart | 307—215 |
| 3,403,266 | 9/1968 | Heuner et al. | 307—247 |

JOHN S. HEYMAN, Primary Examiner

J. D. FREW, Assistant Examiner

U.S. Cl. X.R.

307—247, 291; 328—206